April 21, 1959 W. H. DAILEY, JR., ET AL 2,883,175
SLANT WALL CONSTRUCTION FOR METALLURGICAL FURNACES
Filed March 12, 1956

INVENTOR.
W. H. DAILEY JR.,
ROGER M. WOOLCOTT,
BY Charles S Haughey
THEIR ATTORNEY United States Patent Office 2,883,175
Patented Apr. 21, 1959

2,883,175

SLANT WALL CONSTRUCTION FOR METAL-
LURGICAL FURNACES

William H. Dailey, Jr., and Roger M. Woolcott, Toledo,
Ohio, assignors to Surface Combustion Corporation,
Toledo, Ohio, a corporation of Ohio Application March 12, 1956, Serial No. 570,994

2 Claims. (Cl. 263—46)

This invention relates to metallurgical furnaces for heating billets, blooms, slabs and the like preparatory to plastic deformation by rolling, forging, etc., and particularly relates to those furnaces operating at temperatures of 2350° F.–2600° F.

Upon cyclic heating, volume changes are accelerated in the refractories that are used in the wall construction of such furnaces and are usually manifested in permanent shrinkage. The magnitude of shrinkage appears to be a function of time, temperature and the differential equilibrium between initial and operating furnace conditions. It has been observed that an excessive amount of refractory volume change in vertical wall construction usually results in the "toppling" of such vertical wall toward the hot side.

The invention has for its primary objective the provision of a wall construction which shall be capable of preventing inward "toppling" of the wall as it is subjected to expansion and/or contraction produced by the intense heat and chemical action of the heating flames.

Very tall sidewalls of high temperature furnaces are subject to considerable differences of expansion between the intense heat contacted surface and the outside furnace surface. It is common in heating furnaces to provide sidewalls with a metal outer binding to prevent falling-out of the brickwork as it becomes loose. As the sidewalls are exposed to the high temperature of the heating flames, the inside heat contacted surfaces of some refractories expand more than their opposite faces producing an inward bulge or buckling in the composite wall. When the inward buckling is of such magnitude that the lower bricks do not afford vertical support to those above, a collapse of the wall results. Upon exposure to high temperatures and heating flames, the inside heat contacted surfaces of other refractories contract more than their opposite faces, thereby producing an outward buckling resulting in the inward toppling of the wall. In practice it is felt that this latter condition is the more prevalent and produces more failures of the furnace walls especially where an appreciable differential in the equilibrium between the initial and operating furnace condition exists. Such equilibrium differential is difficult to predetermine because of the uncertainties of the refractory constituents and their behavior upon exposure to cyclic heating.

Crumbling of the wall mortar occurs in most heating furnaces at temperatures below that of the operating temperature of such furnaces. While such crumbling usually does not result in the collapse of the wall, the falling out of the crumbled mortar facilitates the penetration of heat into the refractory wall by exposing the edges and corners of the individual bricks to the heat and other destroying influences which tend to increase the maintenance costs.

An advantage of the present invention is the provision of a side furnace wall adapted to retard inward and outward buckling and prevent the collapse of the composite bricks as they become loose from the deterioration of the mortar.

A further advantage is the provision of a side furnace wall adapted to prevent the falling-out of deteriorated mortar which falling-out increases the exposure of the edges and corners of the individual bricks.

A still further advantage is the provision of a side furnace wall of composite upper and lower sections, and which lower section is of such construction so as to form a more stable foundation for the upper section by lending more lateral support to the wall surface exposed to the heat.

For a consideration of what we believe to be novel and our invention, attention is directed to the following portion of the specification and the drawing and concluding claims thereof.

Figure 1:
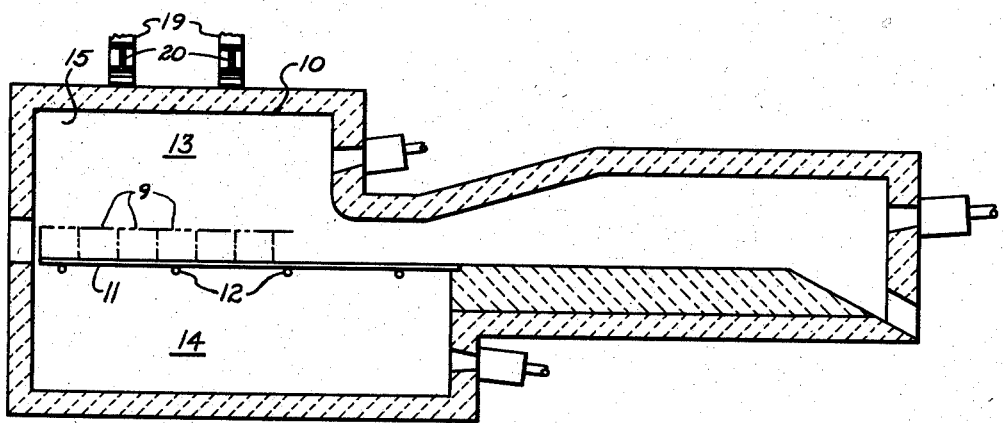
Figure 1 is a schematic longitudinal section of a furnace showing only such portions of the furnace and superstructure as may be necessary to describe the invention.

Referring to Figure 1, 10 designates the heating chamber of the furnace. The heating chamber 10 is provided with water-cooled pipes forming skids 11 on which the billets 9 or other work to be heated is supported within the chamber 10. The skids 11 are supported for part of their length by transverse pipe supports 12. When the furnace is filled with billets 9 or other material, the row of billets supported on the skids 11 separates the heating chamber into an upper section 13 and lower section 14.

Figure 2:
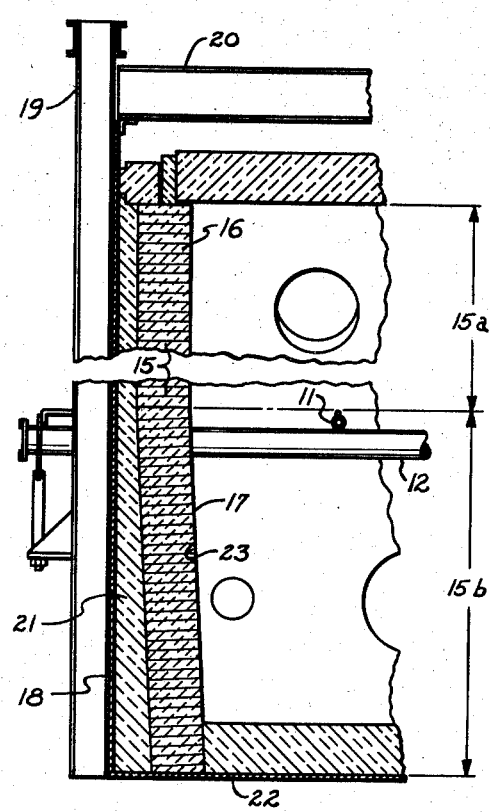
Figure 2 is a fragmentary transverse sectional view taken approximately on the line 2—2 of Figure 1.
Figure 3:
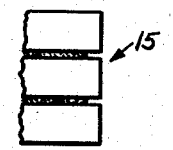
Figure 3 is an enlarged fragmentary section of a vertical side wall construction.

As shown in Figure 2, the side walls 15 are composed of an upper brick section 16 and a lower brick section 17. Forming a part of the furnace side wall 15 are metal bindings 18 which extend throughout the length and height of the furnace. The bindings 18 are suitably supported by buckstays 19 whose upper ends are inter-connected by cross-ties 20. Intermediate the bindings 18 and the wall brick sections 16 and 17 is interposed suitable insulation 21.

The lower brick section 17 has a gradual upward and outward slope which extends from the chamber bottom 22 to a level parallel to the top of the work supporting skids 11. Extension of the slant portion of the side wall beyond the work level would result in a furnace of unnecessary width, therefore in practice the slant height is limited to such work level and the minimum hearth width necessary to accommodate the work is maintained.

It will be understood that the side wall construction may be monolithic in character rather than being composed of separate brick sections 16 and 17 and insulation sections 18. Where the side wall is monolithic, it is preferred that only the inside surface be slanted.

The bricks comprising the lower brick section 17 are preferably disposed with their inside vertical faces 23 inclined to present a composite smooth and slanted inner face to the lower brick section 17 rather than one with a regularly stepped formation. In practice it has been found desirable to provide the inside vertical face 23 of the lower brick section 17 with an upward and outward slope to the order of 2½–4° from the vertical. It is not desirable to have an excessive slope for such excessive slope would necessitate an additional amount of insulation fill 21 thereby increasing the cost of furnace construction.

By providing the lower brick section 17 with an inclined face 23 and a concomitant increase in base plane surface area, increased stability in the lower side wall 15b is obtained thus providing a more stable foundation for the upper brick section 16 without affecting the effective hearth width.

This increased stability permits a reduction in the wall thickness which heretofore has been substantial in order to overcome or prevent buckling of the wall. Thus with the improved construction the required hearth or internal width can be maintained with an attendant substantial decrease in the external width of the furnace. With the present day premium on mill space this reduction in space requirements for a furnace of a given capacity becomes of substantial importance especially in installations in existing mills.

The increased stability is maintained during operation of the furnace without inward collapse of the wall by virtue of the stresses super-imposed by such slant construction. Such stresses can best be explained by the fact that the gravitational forces are resolved into vertical and horizontal components thus any forces tending to produce buckling must overcome the additional horizontal force. The gravitational and frictional forces of a wall of such slanted construction also tend to keep the bricks toward their outside backing without regard to expansion or contraction, thus further retarding buckling that would collapse the side wall.

Figure 4:
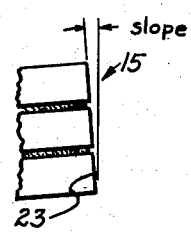
Figure 4 is an enlarged fragmentary section of a slanted side wall construction.

The gravitational forces of such slant construction also tend to retain the mortar as it crumbles between the brick (Fig. 4), thus preventing exposure of the edges and corners of the individual bricks to destroying influences within the furnace.

Another structural advantage obtained by the provision of such slant construction in the lower wall is that the effective column height, stresswise, is reduced to substantially that of the straight vertical portion 15a thereby reducing the tendency for a wall of a given height to buckle when exposed to high temperatures thus reducing the number of tie-ins required and in some cases eliminating the need of tie-ins altogether.

Additional backing may be provided for the outside binding at the line parallel to the junction of the slant and vertical sections of the inside brick lining to absorb the additional stresses concentrated at said line by virtue of such construction.

What we claim as new and desire to secure by Letters Patent of the United States is:

1. In a continuous heating furnace, the combination of: elevated work support means; and a brick side wall comprising two sections of spaced solid blocks of ceramic material, the section above the top of said elevated work support means being disposed in a vertical column and the section below the top of said elevated work support means being disposed in a slanted position to present an inner upwardly and outwardly inclined face, each of said blocks having opposed pairs of vertical and horizontal boundary surfaces, the blocks of said slanted column being disposed with their vertical surfaces aligned to present a smooth inclined inner face to the wall.

2. In a continuous heating furnace, the combination of: elevated work support means; and a brick side wall comprising two sections of spaced solid blocks of ceramic material, one of said sections being disposed in a vertical column and the other section being disposed in a slanted position to present an inner upwardly and outwardly inclined face, each of said blocks having opposed pairs of vertical and horizontal boundary surfaces, the blocks of said slanted column being disposed with their vertical surfaces aligned to present a smooth inclined inner face to the wall, and their horizontal surfaces being disposed at such angle that they will retain loose mortar.

References Cited in the file of this patent

UNITED STATES PATENTS

| | | |
|---|---|---|
| 997,977 | Durban | July 18, 1911 |
| 1,311,962 | George | Aug. 5, 1919 |
| 2,182,674 | Morton | Dec. 5, 1939 |
| 2,755,180 | De Leval | July 17, 1956 |